(12) United States Patent
Kraemer

(10) Patent No.: US 6,648,561 B2
(45) Date of Patent: Nov. 18, 2003

(54) COOLANT DELIVERY SYSTEM FOR CUTTING TOOLS

(76) Inventor: Rolf H Kraemer, P.O. Box 297, Edinboro, PA (US) 16412

( * ) Notice: Subject to any disclaimer, the term of this patent is extended or adjusted under 35 U.S.C. 154(b) by 85 days.

(21) Appl. No.: 09/992,482

(22) Filed: Nov. 19, 2001

(65) Prior Publication Data

US 2003/0095841 A1 May 22, 2003

(51) Int. Cl.$^7$ .......................... B23B 51/02; B23B 51/06
(52) U.S. Cl. ..................... 408/57; 408/226; 408/230; 407/11
(58) Field of Search ................ 408/56, 57, 59, 408/226, 230; 407/11; 409/136

(56) References Cited

U.S. PATENT DOCUMENTS 5,378,091 A  *  1/1995  Nakamura .................. 409/132

FOREIGN PATENT DOCUMENTS

DE         4019428 A1  *  1/1992  ................. 408/57
JP         62246416 A   * 10/1987  ................. 408/57

* cited by examiner

*Primary Examiner*—Daniel W. Howell
(74) *Attorney, Agent, or Firm*—Richard K. Thomson

(57) ABSTRACT

Coolant delivery channels are cut into the external cylindrical side walls of a cutting tool to direct coolant into the cutting flutes of the tool. Coolant delivered through the chuck of a rotary power tool will be conveyed by the channels into the flutes adjacent the cutting edges to provide optimum cooling of the cutting zone.

12 Claims, 3 Drawing Sheets

COOLANT DELIVERY SYSTEM FOR CUTTING TOOLS

BACKGROUND AND SUMMARY OF THE INVENTION

The present invention is directed to an improvement in cutting tools related to coolant delivery. More particularly, the present invention is directed to at least one coolant delivery channel formed in an external cylindrical surface of a cutting tool.

Delivery of coolant to the interface between the cutting edge of a cutting tool and the workpiece where material removal is taking place is critical. If the temperature of this interface is not maintained in a safe zone, i.e., if the temperature is allowed to rise due to inadequate supply of coolant, the cutting edge will deteriorate rapidly and the useful life of the tool will be adversely affected. In addition, coolant is needed to assist in chip evacuation, reducing build-up edge and preventing re-cutting of the chips.

The methods of delivering coolant to date are less than satisfactory. To spray the coolant at the interface has a number of problems. Firstly, it ingests air reducing the effectiveness of the coolant. Second, if the approach angle of the coolant stream is too high, a portion of the coolant will simply splash off the face of the tool or workpiece having little if any effect. Further, with a high approach angle, there is an increased likelihood that the coolant will not contact the interface at all but will, instead, splash off the back side of the chip being removed from the workpiece. This will not have an appreciable impact on the temperature of the cutting tool/workpiece interface. Accordingly, the cutting edge is at risk to reach dangerously high temperatures that will permit accelerated degradation thereof.

One proposed solution to this problem is to incorporate a passageway axially through the center of the tool. This significantly compromises the strength of the tool increasing the incidence of breakage. In addition, it delivers the coolant out the end of the cutting tool which may or may not be the optimum location for coolant delivery. For example, most drills and milling tools, including end mills, would benefit more from coolant delivered to the cutting edges. One attempt to overcome this defect is set forth in U.S. Pat. No. 3,037,264 to Mossberg, for example. Mossberg cuts intersecting radially directed passageways from the central passageway toward the cutting flutes. This will tend to deliver coolant to a more useful location. However, the lateral passageways are subject to clogging by chips; further, the removal of additional material further compromises the integrity of the cutting tool resulting in a higher incidence of failure; finally, the high angle of approach (roughly 90° to the interface) ensures a high percentage of the coolant will impact the outer face of the chip so that it does not meaningfully reduce the temperature of the cutting interface. In addition, manufacturing this tool with the lateral exit holes is a very expensive operation making the tool cost and economics of its use prohibitive. Consequently, sales are minimal.

The improved coolant delivery system of the present invention, which is designed to be used with a cutting assembly which cuts by fastening an elongated cutting tool having a cylindrical wall with at least one cutting flute in the spindle of a rotary power tool where coolant is fed through the spindle for use by the cutting tool, the coolant delivery system comprising at least one channel cut in the cylindrical wall of the elongated cutting tool to convey coolant from the spindle to the cutting flutes of the elongated cutting tool. The delivery system preferably has at least as many, or more, coolant delivery channels as the cutting tool has cutting flutes. Some versions of the tool will require two or more channels per flute to deliver adequate coolant along the full length of the cutting edge. The delivery channels may be configured either as straight, or, if the cutting flutes are helical, the channels may have a helix angle which is equal to, less than or greater than the helix angle of the flutes. By way of the example, the helix angles of the delivery channels may be selected from the group of angles between 0° and 60°. The performance of the channels is enhanced by varying the width and/or the depth of the channel to optimize fluid flow.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figure 1:
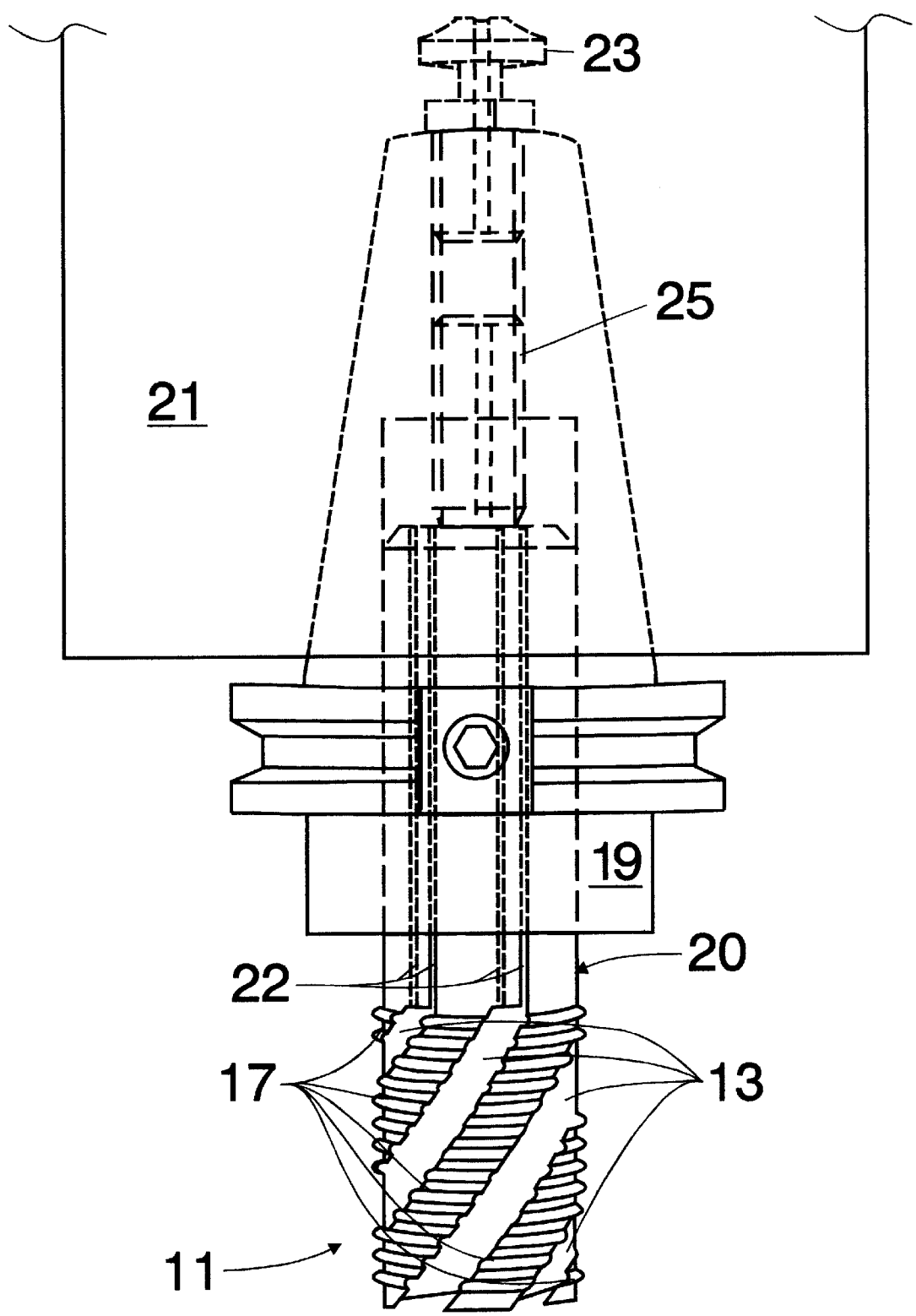
FIG. 1 is a side view of a first embodiment of the improved coolant delivery system of the present invention shown on a rotary cutting tool positioned in a conical tool holder.
Figures 3A, 3C, 3E:
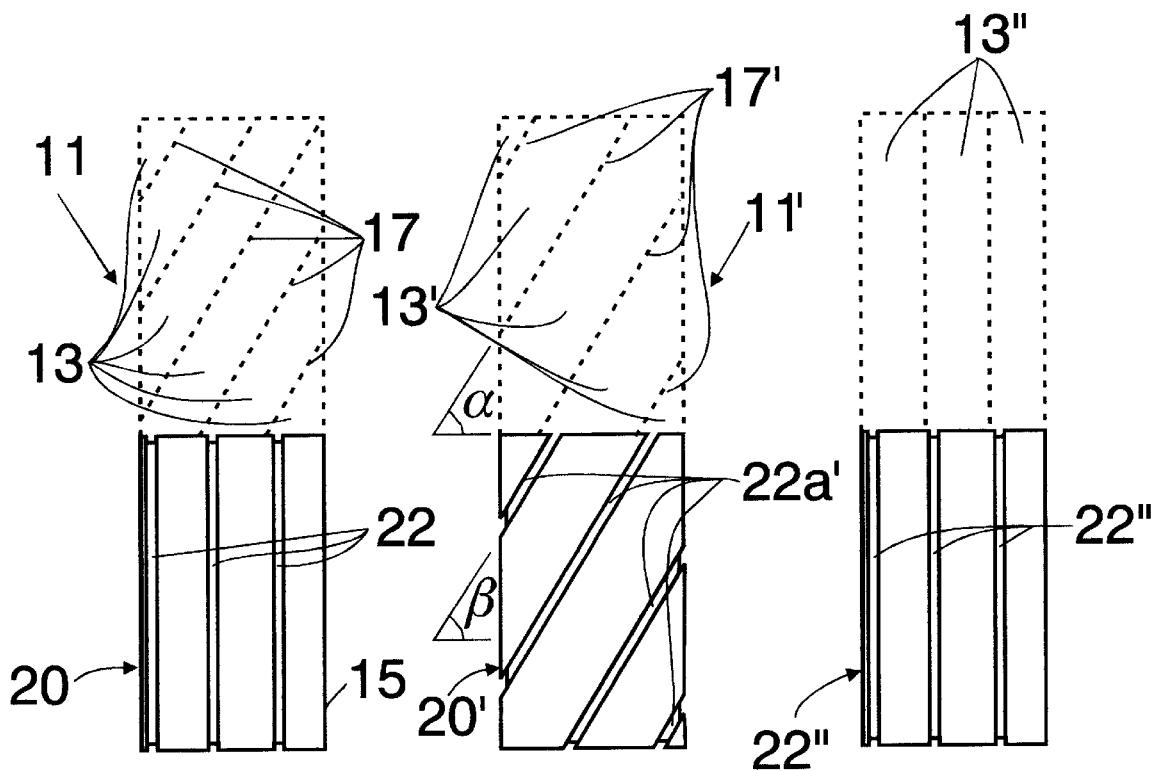
FIG. 3A is a schematic side view of the first embodiment of the present invention.
FIG. 3C is a schematic side view of a second embodiment of the present invention.
FIG. 3E is a schematic side view of a third embodiment of the present invention; and, FIG. 3F is an end view of the third embodiment of the present invention.
Figures 3B, 3D, 3F:
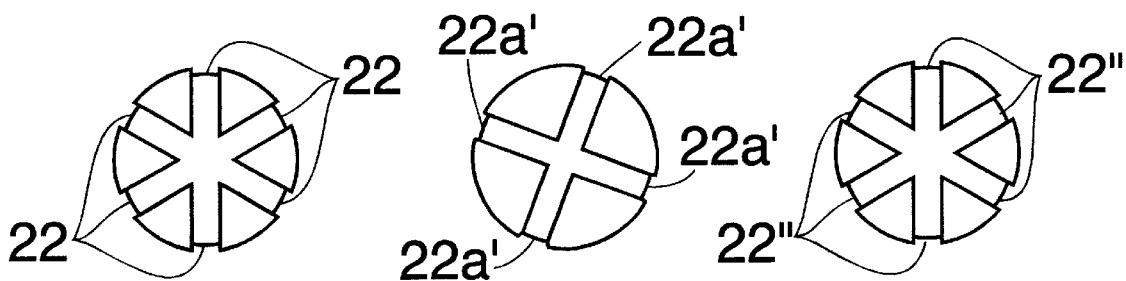
FIG. 3B is an end view of the first embodiment of the present invention.
FIG. 3D is an end view of the second embodiment of the present invention.

A first embodiment of the improved coolant delivery system of the present invention is shown in FIGS. 1, 3A and 3B generally at 20 in conjunction with a rotary cutting tool shown at 11. Cutting tool 11 may be any rotary cutting tool including but not limited to an end mill, a drill, a tap, a reamer, a router, a burr chamfer tool, and a counter sink. Cutting tool 11 has at least one cutting flute 13, shown in FIG. 1 as six helical cutting flutes 13. The shank end 15 of tool 11 is inserted into a tool holder 19 that will be received in a spindle 21 of a rotary power tool. The improved coolant delivery system 20 of the present invention comprises at least one coolant delivery channel 22 cut in the shank end 15 of tool 11 and intersecting the at least one cutting flute 13. Since the embodiment shown in FIG. 1 has six cutting flutes, it is preferred that shank end 15 be configured with at least six coolant delivery channels 22. More channels 22 may be needed (two or three per flute, for example, as shown in dotted lines in FIG. 1) to ensure adequate coolant delivery to the cutting edge.

As shown in FIG. 1, milling tool 11 is inserted in tool holder 19 that is inserted in spindle 21 by means of draw bolt 23. Set screw 25 provides a variable position end stop for milling tool 11. Both draw bolt 23 and set screw 25 have axial fluid passageways formed therein to permit coolant to be fed therethrough to the milling tool 11.

Figure 2:
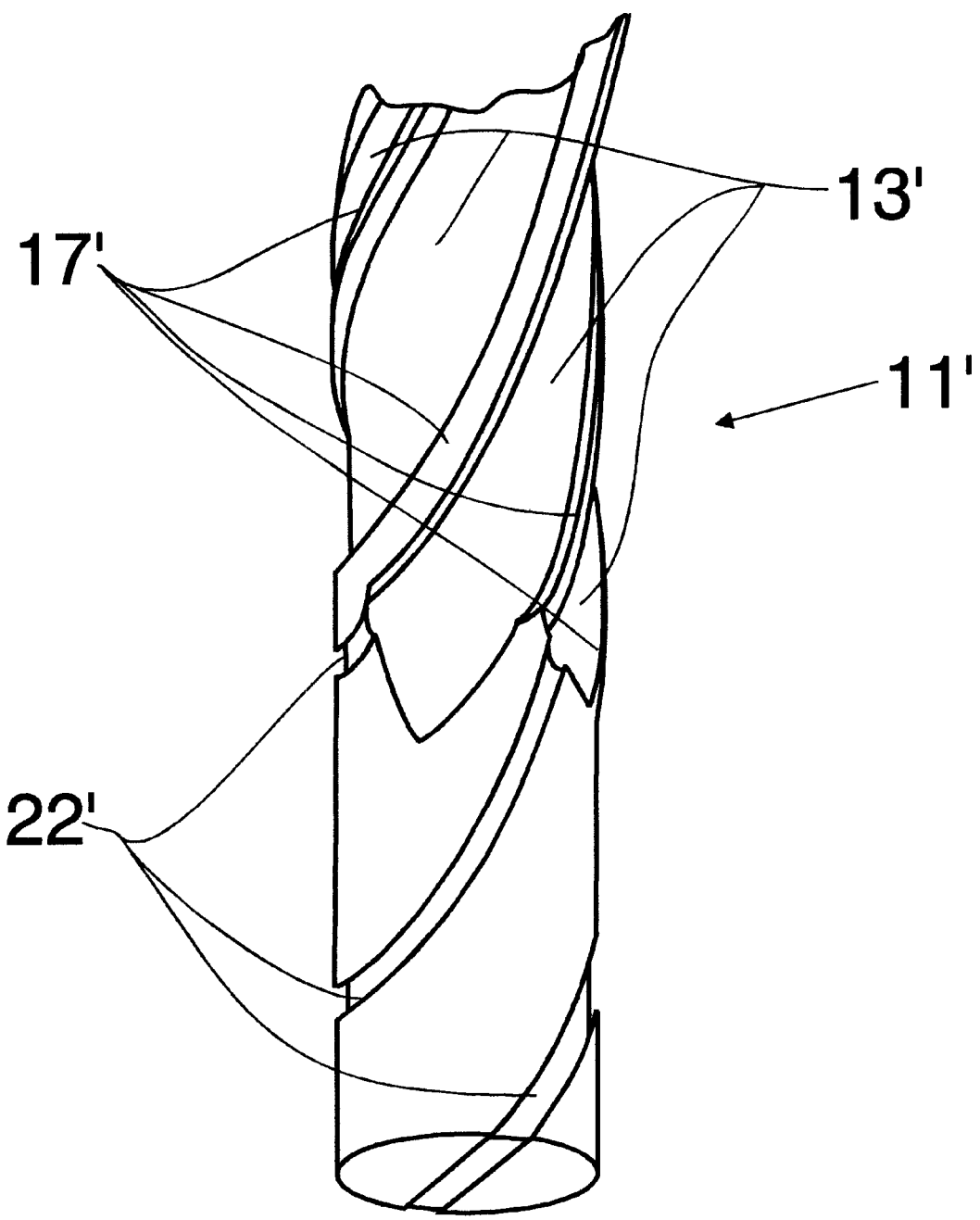
FIG. 2 is a detailed side view of the first embodiment.

A second embodiment is shown in FIGS. 2, 3C and 3D generally at 20'. In this embodiment, the cutting flutes 13' are helical, as are the coolant delivery channels 22'. In the FIG. 2 embodiment, tool 11' has two cutting flutes 13', so cooling system 20' has two channels 22', as well. In FIGS. 3C and 3D, the second embodiment is depicted with four channels 22a'. A third embodiment 20" shown in FIGS. 3E and 3F show the straight channels 22" delivering coolant to straight cutting flutes 13 ".

As seen in FIG. 3C, these channels 22a' may have a helix angle β that matches the helix angle α of the cutting edges 17' formed by cutting flutes 13'. Alternatively, the helix angle β of delivery channels 22 may be a fixed angle that is greater or less than the helix angle of cutting edges 17' and may be any angle between 0 and 60°. β may be, for example, 15°, 30°, 45°, and 60°. One configuration which appears promising is one in which β is one half of α, i.e., where α is 30°, β is 15°. It is preferred that channels 22 feed into the flutes 13' in the half nearest the cutting edges 17'. Otherwise, there has been some indication that the coolant will spill out of the flutes 13' before it can be of any real use. With this configuration, the coolant is supplied at the minimum possible approach angle and will flow into the flute 13' underneath the chip being formed during the cutting operation. This will ensure optimum cooling. The width of channels 22' should be at least as large as their depth to facilitate coolant flow. As seen in FIGS. 3B, 3D, and 3F, channels 22, 22' and 22" are initiated at the center of the shaft on the tail end of cutting tool 11.

The cutting tool 11 equipped with the improved coolant delivery system 20 of the present invention can be inserted into the chuck of a rotary power tool with or without a tool holder 19, depending on the nature of the tool 11 itself. Most rotary power tool chucks are equipped with the capacity to convey coolant toward the cutting zone. As seen in FIG. 1, this includes a passageway 12 through tool holder 19. The coolant being conveyed through the chuck will find openings created by channels 22 that are gripped in the chuck of the rotary power tool. The fluid will flow out these openings and will naturally tend, due to surface tension, to remain in the channels 22 as it is forced out of the chuck. The coolant in channels 22 is funneled into cutting flutes 13 adjacent cutting edges 17 removing heat and chips from the cutting edge, workpiece interface keeping the cutting edges 17 from reaching elevated temperatures and recutting chips that could produce degradation of the cutting edge. It will be appreciated that the term "coolant" is not limited to fluids but may include gases including, for example, refrigerated air.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. In an assembly for cuffing by fastening an elongated cutting tool having a shaft with a cylindrical wall with at least one cutting flute, in the chuck of a rotary power tool where coolant is fed through the chuck for use by the cutting tool, the improvement comprising at least one channel cut in said cylindrical wall of said elongated cutting tool to convey coolant from the spindle to the cutting flutes of said elongated cutting tool, said at least one channel being initiated at a center of said shaft on the tail end of said cutting tool.

2. The improvement of claim 1 wherein said elongated cylindrical cutting tool is selected from the group consisting of an end mill, a drill, tap, reamer, router, burr chamfer tool, and counter sink.

3. The improvement of claim 1 wherein the at least one cutting flute is helically wrapped around the elongated cylindrical cutting tool adjacent a first end and said at least one channel is also wrapped around said elongated cylindrical tool adjacent a second opposite end to intersect with the at least one cutting flute to deliver coolant from the chuck of the rotary power tool thereto.

4. The improvement of claim 3 wherein a helix angle of said channel is equal to a helix angle of said cutting flute.

5. The improvement of claim 3 wherein a helix angle of said channel is less than that of a helix angle of said cutting flute.

6. The improvement of claim 5 wherein said helix angle of said channel is generally about one half that of the helix angle of the cutting flute.

7. The improvement of claim 5 wherein the helix angle of said at least one channel is in the range from 0° to 60°.

8. The improvement of claim 1 wherein the at least one cutting flute comprises a plurality of cutting flutes and said at least one channel comprises a like plurality of channels.

9. The improvement of claim 8 wherein said plurality of channels extend straight down an elongated shank of said elongated cylindrical tool.

10. The improvement of claim 8 wherein said plurality of channels extend helically about the cylindrical wall of said elongated cutting tool.

11. The improvement of claim 8 wherein a number of said plurality of channels exceeds a number of said plurality of cutting flutes.

12. The improvement of claim 1 wherein a width of said at least one channel is at least equal to its depth.

* * * * *